Figure 1:
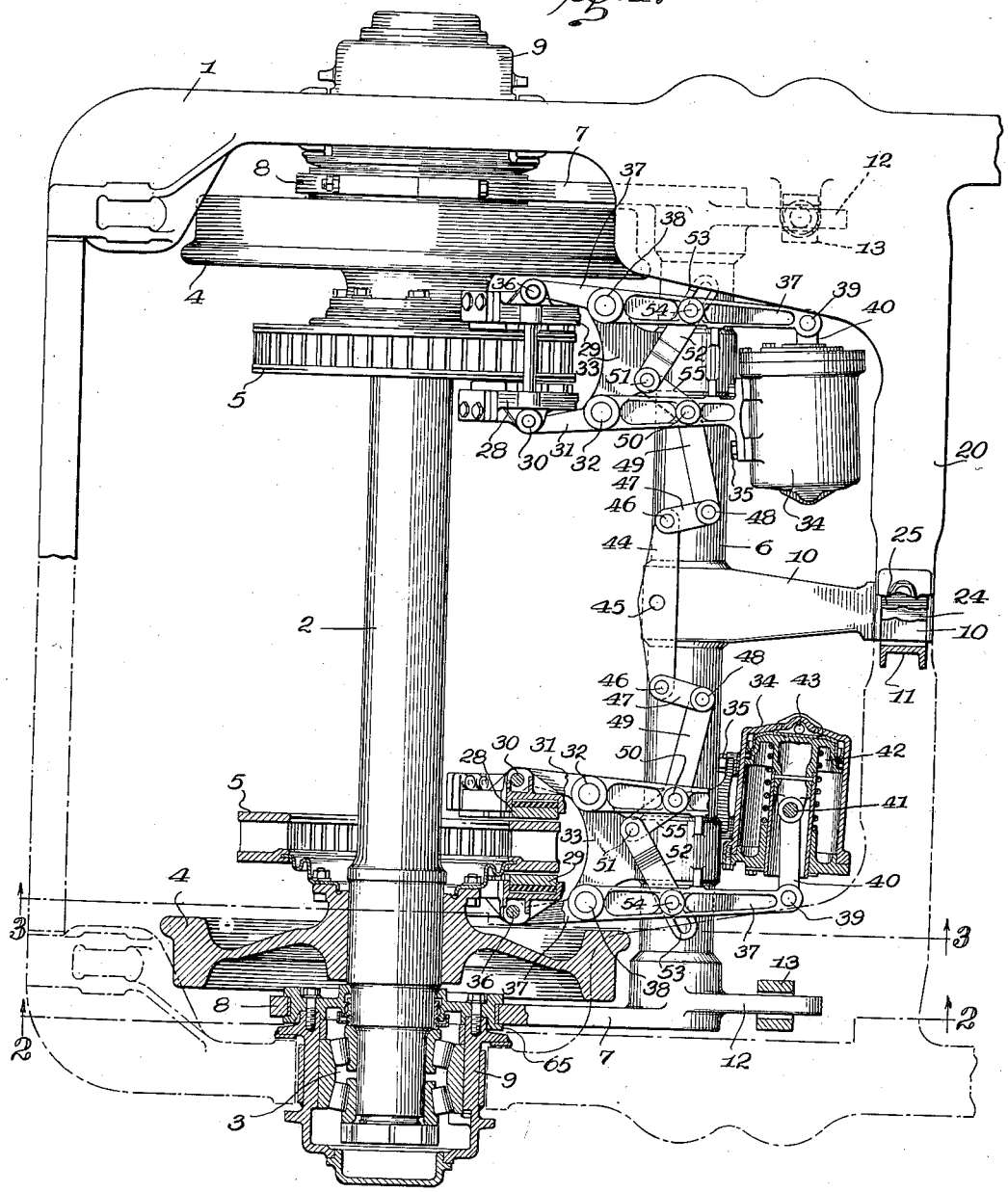

April 1, 1941.  C. L. EKSERGIAN  2,236,898

BRAKE MECHANISM

Filed April 29, 1939  4 Sheets-Sheet 1

INVENTOR:
Carolus L. Eksergian
BY
John P. Barby
ATTORNEY

April 1, 1941.                C. L. EKSERGIAN                2,236,898
                                BRAKE MECHANISM
                              Filed April 29, 1939          4 Sheets-Sheet 2

INVENTOR:
Carolus L. Eksergian
BY John P. Jacobs
ATTORNEY

April 1, 1941.  C. L. EKSERGIAN  2,236,898
BRAKE MECHANISM
Filed April 29, 1939  4 Sheets-Sheet 3

INVENTOR:
Carolus L. Eksergian
BY
ATTORNEY

April 1, 1941.   C. L. EKSERGIAN   2,236,898
BRAKE MECHANISM
Filed April 29, 1939   4 Sheets-Sheet 4

INVENTOR:
Carolus L. Eksergian
BY John P. Taub
ATTORNEY

Patented Apr. 1, 1941

2,236,898

UNITED STATES PATENT OFFICE 2,236,898

BRAKE MECHANISM

Carolus L. Eksergian, Detroit, Mich., assignor to Budd Wheel Company, Philadelphia, Pa., a corporation of Pennsylvania Application April 29, 1939, Serial No. 270,750

16 Claims. (Cl. 188—153)

The present invention relates to brakes and means for operating and mounting the same.

More specifically it relates to brakes of the type disclosed in copending application Serial No. 198,398, filed March 28, 1938, for Brake construction, now Patent No. 2,228,818, issued January 14, 1941.

In the said former design, bearings were provided on that portion of the axle between the wheels which, while entirely satisfactory in operation and construction, is a more expensive embodiment, particularly when used with live axles, and also gives rise to additional difficulties such as the maintenance of these bearings which are not so readily accessible because they are between the wheels and which also give rise to problems of sealing the oil against leakage. In the present construction the bearings for the brake structure are placed outside the wheels, and therefore can be applied readily to standard live axles. The bearings for the present brake supporting means are arranged around the journal boxes.

The present invention provides air cylinders, one for each brake, the cylinders being of the single-acting type wherein only a single piston is located within each cylinder and the cylinder itself moves in the opposite direction from that of the piston, thereby requiring no equalizing means, since the forces exerted by the piston and by the cylinder are in the nature of action and reaction, and thus are exactly equal and opposite to one another at all times. This embodiment, using single-acting cylinders and pistons, is made possible by mounting the cylinder directly on one of the brake actuating elements.

Another object of the present invention is to provide an improved mounting for the brake yoke which is supported on rubber pads or the like on a cross frame of the truck, thus making it possible to take up the slight relative lateral and longitudinal motions which occur between the yoke and the truck, either absorbing them directly by the rubber in shear or accommodating them by means of a sliding contact between a steel or other metal plate vulcanized to the rubber, and the yoke bearing. The rubber also provides sufficient flexibility to take up any stresses resulting from possible twisting occurring between the plane of the yoke and the plane of the cross frame of the truck.

A variation of the invention consists in employing springs in place of the rubber pads. In this embodiment there is preferably one spring above the arm which projects from the brake yoke, and another spring below the said arm.

While in certain embodiments of the invention the cross member of the brake yoke has solid supporting arms extending from its ends, in one form thereof the supporting arms are also in part tubular, and such parts are made as integral bent parts of the tube forming the cross member of the yoke.

It will be noted that the working parts of the brake structure in accordance with the present invention are all kept alined in a single plane with the axle thus materially simplifying the structure and preventing any unbalanced strains.

The invention is disclosed in the accompanying drawings, wherein a preferred embodiment and several variations are disclosed.

Figure 5:
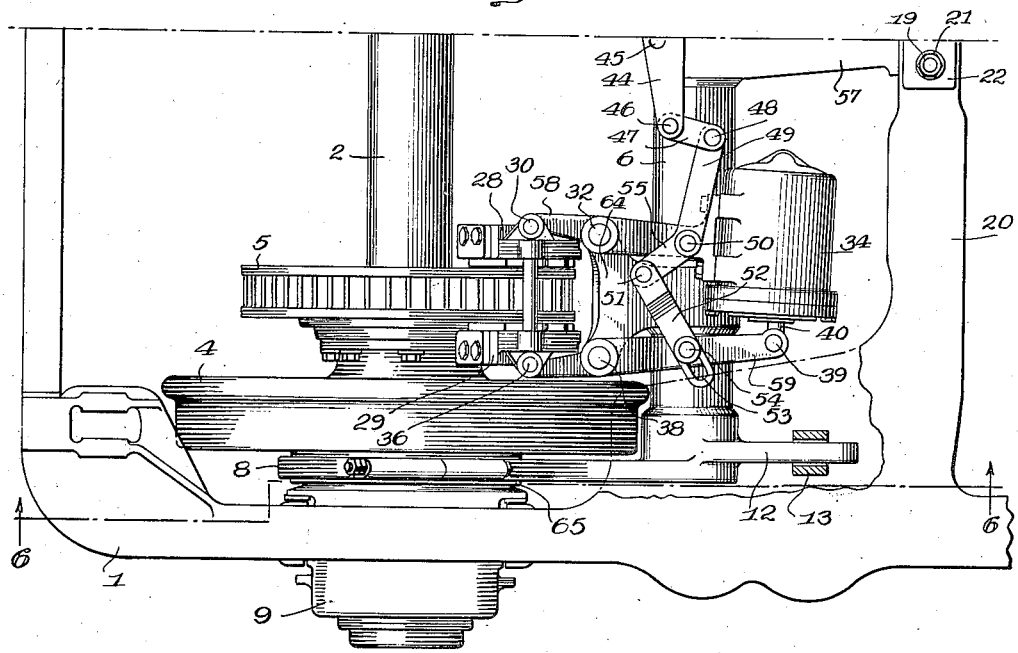
Figure 6:
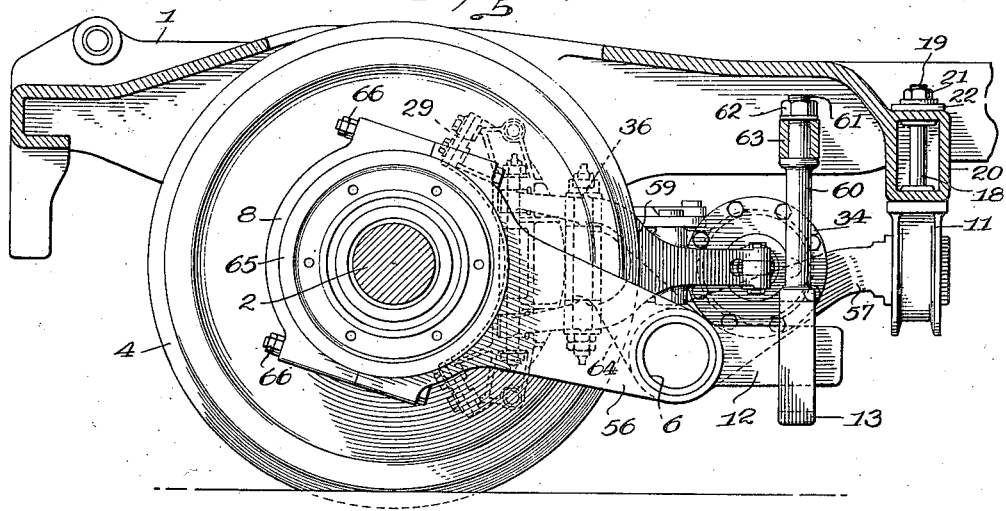
Figure 7:
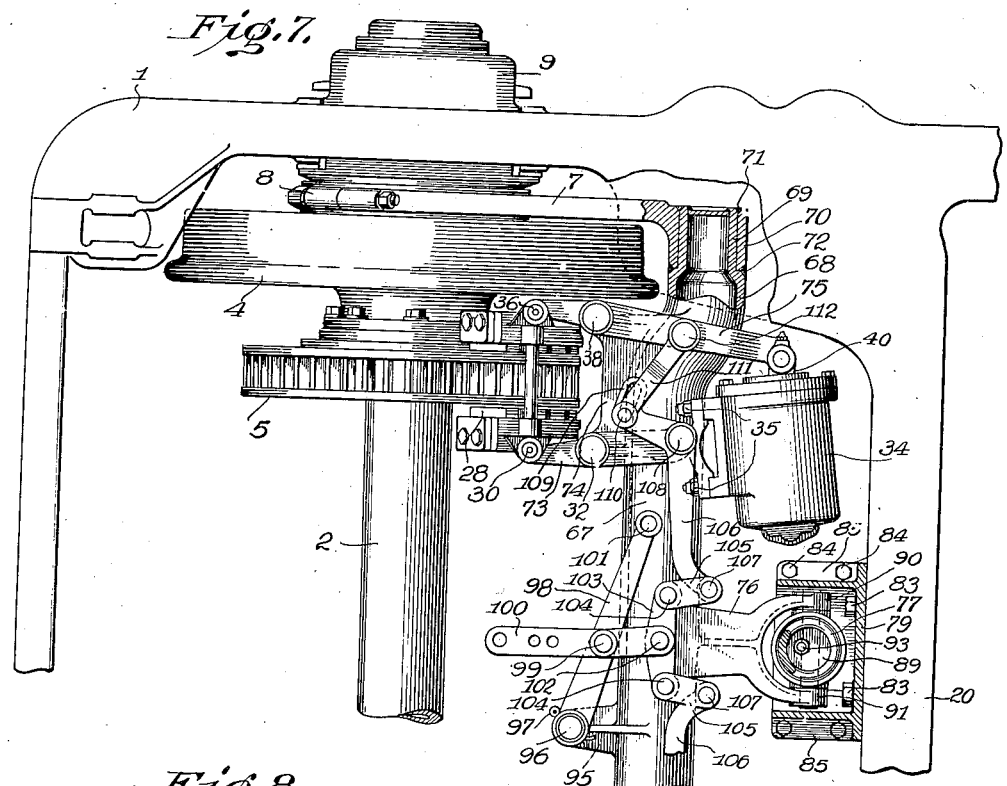
Figure 8:
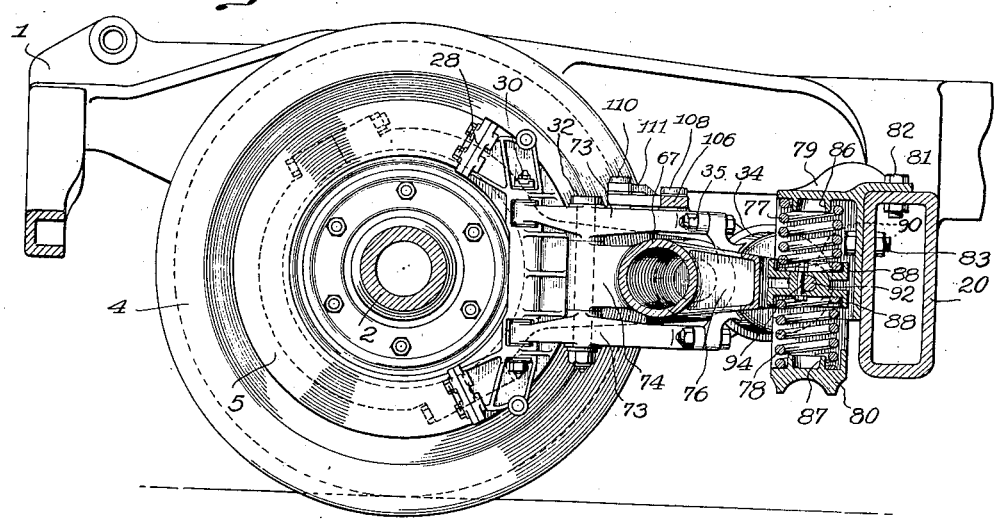

In said drawings:

Fig. 1 is a plan view with certain parts shown in central axial section,

Fig. 2 is an elevation partly in section on the planes indicated by the broken line 2—2 of Fig. 1, looking in the direction of the arrows, Fig. 3 is an elevation partly in section on the planes indicated by the broken line 3—3 of Fig. 1, looking in the direction of the arrows, Fig. 4 is a detail view partly in section showing a fragment of the cross member of the truck frame and a supporting means for the end of the brake yoke, showing the arrangement of the rubber for taking up stresses, Fig. 5 is a plan view of one half of a slightly modified wheel- and brake-mechanism similar to that of Fig. 1, but wherein the tubular member of the brake yoke is disposed below the plane of the brake cylinder and linkages, whereby economy of space is attained, since the brake cylinder may be closer to the wheel axle, Fig. 6 is a partly sectional elevation of the structure shown in Fig. 5 the section being made on the planes indicated by the broken line 6—6 looking in the direction of the arrows, Fig. 7 is a fragmentary partly sectional plan view of a still further modification, wherein the tubular cross member of the brake yoke has its end portions bent to form supports not coaxial with the tubular cross member of the brake yoke itself and wherein springs are substituted for the rubber pads, and Fig. 8 is a partly sectional elevation of the structures shown in Fig. 7.

Referring first to Fig. 1, I indicates a portion of a wheel truck in which the axle 2 is mounted, being supported by suitable roller bearings or the like as indicated at 3, and carrying the wheels 4. Each wheel carries a brake ring 5 of the type disclosed for example in the copending case above referred to.

A tubular cross member 6 having at each end an arm 7 extending toward the axle 2, is mounted in the truck by means of straps 8 carried by said arms 7 and is thereby mounted pivotally in the grooved member 65 about the axis of the axle 2, or of its journal boxes, 9.

An arm 10 extending in the opposite direction from the tubular member 6 and substantially in the same general plane with the tube 6 and axle 2, extends into a support 11, Figs. 2, 3 and 4, which contains yieldable means for taking up any relative motion between the axle and the truck, so as to avoid the production of injurious stresses in the brake supporting structure.

Additional arms or projections 12, extending in a direction opposite to the arms 7, pass through yokes 13 wherein they are received with ample play, particularly in a vertical direction, so that normally these arms 12 are entirely out of contact with the yokes 13. The yokes 13 are secured to the truck 1 as shown best in Figs. 2 and 3, by means of the stems 14 which have screw threads 15 thereon and pass through lugs 16, with nuts 17 to secure them to the frame of the truck.

The yoke 11 which receives the arm 10 is secured to the truck 1 by means of two upwardly extending stems 18, having threads 19 thereon, which pass through the cross member 20 of the truck and are secured thereto by the nuts 21, a bearing plate 22 and suitable lock washers 23 preferably being provided as best shown in Fig. 4.

The above mentioned arm 10 is preferably made hollow for lightness as shown best in Fig. 4 and it may rest between steel or other metal plates 24 which are in turn vulcanized to rubber plates 25, the arm 10 having projections 26 and 27, at its end, and spaced somewhat from its end, respectively, to hook over the steel plate and part of the rubber in order to prevent longitudinal shifting of the said steel and rubber plates along the arm 10. In this way the rubber plates, which are arranged above and below the end of the arm 10, provide for a yieldable mounting of the said arm and prevent any undue stresses from being produced by relative motion of the brake mounting and the truck while yet preventing rotation of the brake mechanism about the axle 2.

In order to apply a braking effort to the brake rings 5, the annular-arcuate brake shoes 28 and 29 cooperating with each of said rings must be forced thereagainst and this is accomplished by two alternative means, one being the air braking system and the other the hand brake linkage or emergency service system. It will be noted that each brake shoe 28 is pivotally attached at 30 to a corresponding lever 31, pivoted at 32 to a bracket 33 secured to the tubular member 6, the other end of each lever 31 being attached to an air cylinder 34 by any suitable means such as the cap screws 35, so that when the two cylinders 34 move toward one another the brake shoes 28 will be forced outwardly against their respective brake rings 5 due to the pivotal motion of the levers 31 about their relatively fixed pivots 32.

The brake shoes 29 which cooperate with the outer surfaces of the brake rings 5 are similarly pivotally attached at 36 to the inner ends of the levers 37 which are pivotally mounted at 38 on the same brackets 33, the levers 37 terminating at their far ends in pivotal mountings 39 carried by connecting rods 40 pivoted at 41 to pistons 42 operating in the respective cylinders 34. It will thus be seen that when the pistons 42 move outwardly in their respective cylinders 34 they will cause the pivots 39 to move outwardly, thereby turning the levers 37 about their relatively fixed pivots 38 and causing the brake shoes 29 to move inwardly.

Thus when air is admitted to the cylinders 34 through the ports 43 which are connected to any suitable flexible air supply means, not illustrated, the result in each case will be that the brake shoes 28 and 29 will be forced against the opposite sides of the corresponding brake rings 5, due to the relative motion of the cylinder and piston in each case and moreover the braking efforts produced on both sides of the brake ring will be equal, since the mounting of the levers 31 and 37 provides for free equalization of the forces applied by the cylinder and piston respectively, which of course themselves are equal ab initio.

In order to make it possible to operate the brakes in case of failure of any part of the air brake system, an emergency hand brake is provided which comprises the link 44 to which the brake rod is attached by means of the hole 45 at the mid point of the link 44. The link 44 has at each end thereof a pivot 46 on which is pivotally mounted a short link 47 which is in turn pivoted at 48 to the long arm of a bent lever 49 pivoted at 50 to the respective lever 31 which operates the internal brake shoes 28. The short arm of the lever 49 is pivotally connected at 51 to a link 52 having a slot 53 at its other end, engaging slidably as well as pivotally about a pin or pivot 54, mounted on the respective lever 37 which actuates the corresponding outer brake shoe 29.

It will be seen that when a pull is exerted upon the brake rod (not shown) attached to the link 44 it will have the ultimate effect of tending to straighten the toggle linkage formed by the short arm 55 of the lever 49 and the link 52, thus forcing the long arms of the levers 31 and 37 apart without however acting more forcibly on one than on the other, because the short link 47 will permit equalization in each case. It is thus clear that a pull on the hand brake rod will apply all four brake shoes with equal force. When the hand brake rod is not actuated, the slotted portion 53 of each link 52 will permit free movement of the air brake structures, entirely independently of the hand braking means.

In normal operation the arm 10 will be supported in the surrounding yoke 11, but in case the arm 10 or the supporting yoke 11 should fail by reason of breakage, the arm 12 will then still hold the brake mechanism in proper operative position because the yokes or safety hangers 13 will then come into play and prevent the brake mechanism from dropping.

It will be understood that the arms 7 together with their straps 8 are pivoted about the grooved member 65 concentric with the axle 2 so that the tube 6 may pivot slightly about the axis of the said axle, which thus permits the tube 6 to assume the proper position and avoid undue stresses while at the same time the straps 8 permit ready removal of the entire brake structure, upon merely removing the fastening nuts 66. The brake yoke is not secured positively to the truck 1 at any other places than by means of the two arms 7 and their mountings and these elements are readily accessible since they are outside of the wheels, thus making it easy to adjust the mechanism or to remove it for inspection or repair.

Referring now to the modification shown in Figs. 5 and 6, this form of device provides additional economy of space. This economy is attained by dropping the tubular member 6 below the plane of the brake linkage, which makes it possible to bring the brake cylinders 34 closer to the axle 2 and thus provides an assembly which may be accommodated in a shorter space in forward-and-back direction in the truck.

1 indicates the truck having the journal boxes 9 in which the axle 2 is mounted. This axle carries the wheels 4 and brake rings 5 with which cooperate the internal and external brake shoes 28 and 29 respectively, which are carried by the levers 58 and 59. A bracket 64 secured to the tubular support 6 has a pivot 32 about which the lever 58 moves and a pivot 38 for the lever 59. The respective levers are pivoted to the brake shoes at 30 and 36 at their short ends, and at their long ends they are attached respectively to the corresponding cylinder 34 and the piston rod 40, which is pivoted at 39.

An arm 56 which is inclined as shown connects the tube 6 with its bearing 65 around a portion of the journal 9 and the connecting strap 8 serves to secure it in place. A horizontal arm 12 projects rearwardly from the tube 6 and is supported loosely in the yoke 13, which is held to the truck 1 by means of the support 60 having a screw threaded end 61, received in the lug 63 of the truck and secured thereto by means of the nut 62.

In place of the straight arm 10 which extends centrally from the tube 6 in the first described form, here an upwardly inclined arm 57 is substituted, which accomplishes the same function, that is, it is supported at its end in the yoke 11, with yieldable cushions interposed as in the previously described form. The yoke 11 is secured to the cross member 20 of the truck 1 by means of the rods 18 which are screw threaded at 19 and held to the bearing plate 22 resting on the cross member 20 by means of the nuts 21, just as in the other form. The bracket 64 which takes the place of bracket 33 also is inclined upwardly as shown, and supports the pivots of the relatively shorter levers 58 and 59 which replace levers 31 and 37 of the first-described form.

The operating means for the hand or emergency brake is precisely the same as that employed in the previously described form and its elements are designated by the same reference characters. It will be understood that the parts shown in Fig. 5 are duplicated symmetrically on the other side of the horizontal center line forming the upper boundary of Fig. 5.

A modified form of device shown in Figures 7 and 8 attains certain advantages of simplicity and compactness in a somewhat different way.

In this form of the invention the yoke member 67, corresponding to member 6 of the preceding forms, is made in the form of a tube with offset or "cranked" ends, as at 68. That is, at each end the yoke member 67 is bent at an angle and then the ends are bent back into parallelism with the axis of the tube 67 but offset therefrom sufficiently to enable the said ends to clear the wheels 4, while the major portion of the yoke member thus becomes located closer to the axle 2.

In this way horizontal longitudinal space is additionally economized, a very important feature in the limited room available.

The yoke element 67 may have its ends somewhat reduced in diameter, as shown at 69 and these reduced portions will be received in the tubular ends 70 of the supporting arms 7, to which they are secured by suitable welds, as at 71 and 72, so as to constitute substantially a single rigid integral element with said arms. The arms 7 are pivotally supported from the journals by means of straps 8, as previously described.

A cylinder 34 is located near each end of the yoke member 67, and is provided with a piston, as in the other forms, previously described. Each cylinder is attached as by bolts and nuts 35 to one arm of a lever 73, pivoted at 32 to a lug 74, preferably integral with the tube 67 so that when the cylinder moves toward the longitudinal center line of the truck, the other arm of its lever 73 will move outward, so as to force the brake shoe 28, pivoted thereto at 30, against a brake surface of the brake ring 5.

The connecting rod 40, attached to the piston in cylinder 34, simultaneously will force outward the adjacent arm of lever 75, pivotally mounted at 38 in the lug 74, so that the other arm of said lever, acting through the pivot pin 36 which connects it with the other brake shoe 29, will force shoe 29 against the other brake surface of the brake ring 5, thus engaging both faces of said ring between the two shoes 28 and 29. Since these shoes are actuated by cylinder and piston respectively, they, of course, will engage the ring with equal force on both sides, thus distributing the braking effort uniformly thereon.

The brake yoke may be prevented from turning about the axis of axle 2 by means of the outwardly extending arm 76, engaging a support carried by the cross member 20 of the truck frame. While this arm 76, which is preferably integral with the tubular member 67, might be supported by rubber pads or similar resilient material, like arm 10 of Figure 1 for example, a different type of resilient and yieldable suspension is here disclosed. This suspension avoids all use of rubber or other organic material, and is, therefore, in some ways more resistant to destructive agents which would eventually injure rubber and the like, such as chemical impurities in the air, moisture, excessive heat, etc., which may sometimes be encountered in service, and which would tend to harden and age rubber and similar substances prematurely.

In Fig. 8 helical metallic springs 77 and 78 are disclosed. The springs are mounted in a casing which may advantageously comprise an upper section 79, secured to the cross beam 20 of the truck by a flange 81 and bolts 82 and 83 and a lower section 80, the sections being removably held together by bolts 84 in cooperating flanges 85. Lugs 86 and 87 in the respective sections serve to prevent the outer ends of the springs from slipping out of the casing, and their inner ends are kept in proper relation to the end of the arm 76 by circular flanges 88 formed thereon. The original inserting of the springs in their casing, as well as any necessary subsequent removal or insertion of springs, is made easier by reason of the two part construction of the casing, since removal of the lower section 80 by unscrewing the bolts 84 will give ready access to the contents of the said casing.

In order to avoid mis-alinement between the springs and the end of the arm 76, the said end is preferably made as a separate element 89, pivotally supported in a fork 90, 91 formed on the arm 76, a suitable pin 92 passing through the parts 90, 89 and 91 to serve as the pivot, and being prevented from slipping out of place by any suitable device, here shown as a bolt 93 passing through a hole in the element 89 and engaging in a notch 94 formed in the side of the pin 92.

The hand-operated or emergency brake linkage may comprise the following parts:

A lug 95 preferably is formed on the tube 67, and extends toward axle 2, to afford a suitable support for lever 98, which is pivotally held by pin 96, mounted in lug 95 and secured against loosening by any suitable locking device, such as the cotter pin 97.

The lever 98 is pivotally connected at 99 to a link 100 and at its end has a hole 101 to afford connection to the brake operating rod. The link 100 is pivoted at 102 to the equalizing lever 103, pivotally connected at its ends to the links 105, by means of the pivots 104.

Each link 105 has at its other end a pivot 107, whereby it is attached to the inner end of its respective lever 106. Each lever 106 is pivoted at 108 to the corresponding adjacent lever 73, and is bent sharply at the said pivot as shown, to provide a relatively short arm extending toward the axle 2. At its end, each of the said arms has a slotted portion, 109, which receives the pivot pin 110 attached to the link 111, which link is also pivotally secured to the lever 75 as shown at 112. The slotted portion 109 thus serves as a lost-motion device, whereby the levers 73 and 75 may operate freely under control of the air brake cylinder and piston, without restraint by the manual brake operating parts.

The operation of the devices disclosed in Figs. 1 to 6 of the present case will be clear from the structures described, but may be summarized briefly as follows:

When air under pressure is applied to the cylinders 34 the result will be that the brake shoes 28 and 29 will be forced against the opposite sides of the brake rings 5, the pressures being completely equalized by reason of the fact that the pressure on one side is produced by the piston, while that on the other side is produced by the corresponding cylinder, which of course are identical in magnitude. By reason of the fact that the whole assembly of cylinder and piston is freely movable about the pivots 32 and 38 the brake shoes are free to adjust themselves against the brake rings so that nothing can interfere with such equalization.

By reason of the fact that all the air cylinders are identical and supplied from a common source of air, all the pressures will of course further be equal to one another, that is, the pressures exerted on the brake rings carried by the right and left hand wheels automatically will be the same, even though this may not be an important feature. Any stresses which might otherwise result from binding, in case there were a rigid connection between the brake yoke and the truck frame, are completely eliminated by reason of the yieldable mounting of the rear arm 10 of the brake yoke, wherein the available distortion of the rubber etc. as well as the available sliding movement entirely eliminate any such stresses.

The arms 12 extending from the tubular member 6 and carried in the yokes 13, but out of contact therewith, provide a safety feature in case the arm 10 should fail for any reason, since the yokes 13 would then support the braking mechanism until repairs could be made.

In the form shown in Figs. 5 and 6 the operation is, of course, the same as in Figs. 1 to 4, the only difference being that this form of device is made more compact in a forward-and-back direction, by placing the tubular brace 6 below the horizontal plane containing the axes of the axle 2 and of the braking pistons, and, therefore, the same operative features as those above described will apply to Figs. 5 and 6 also.

The operation of the form illustrated in Figs. 7 and 8 is of course practically the same as that of the previously described forms. The bends near the ends of the tubular member 67 bring its central portion closer to the axle 2 than would otherwise be possible, thus resulting in economy of space and permitting a material shortening of the trucks, by shortening the levers 73 and 75 and also by bringing the cylinders 34 closer to the axle of the wheels.

Air pressure in the cylinders 34 will force each piston out of its cylinder, thus causing the brake shoes to engage the opposite faces of the rings 5 with equal force in each instance. A pull on the manual brake rod engaged in the hole 101 of the lever 98 will cause the equalizing lever 103 to move toward axle 2, thereby applying equal pulls on the two links 105, and thus on the long arms of the two levers 106, whereby their short arms, in combination with the links 111, will form toggles acting to separate the corresponding ends of the levers 73 and 75, so as to cause the brake shoes to engage the respective brake rings 5. When the manual brake is in action, the pins 110 will lie against one end of the slots at 109, while the same slots will permit lost motion to occur when the air brake cylinders are used, as already mentioned above.

The metal springs 77 and 78 will provide a yielding support for the outer end of the lever 76, so as to hold it in proper position, while taking up any sudden jolts or shocks, or slight differences of alinement occurring in operation of the vehicle. If the lower spring 78 should break, the lever arm 76 would then drop against the bottom of the casing and would still be adequately supported thereby until repairs could be made, thus protecting the vehicle against loss of braking on failure of a spring. It will be seen that the wholly metal construction resulting when metal springs are employed in place of rubber pads or the like has certain inherent advantages, such as better resistance to chemically active gases or solvent liquids, as well as resistance to the aging effects of air, light and heat, all of which are well known enemies of rubber.

In all of the forms the operation of the emergency brake in no way interferes with the operation of the air brakes, since play is available in the slotted links or lever arms of the hand brake.

While several forms of the brake mechanism have been disclosed and described in detail, it will of course be understood that many other modifications are possible and that, therefore, the scope of the present invention is limited not by the disclosure but only as defined in the following claims.

I claim:

1. A brake mechanism comprising a wheel and axle, a brake ring connected therewith, brake shoes in cooperative relation with the opposite faces of the said ring, a brake yoke pivotally supported about the axis of the axle, means for preventing the yoke from turning about the said axis, and pressure-fluid actuated mechanism carried by the brake yoke, comprising two members movable in opposite directions, and connected one to each brake shoe, whereby fluid pressure will cause both brake shoes to engage the said brake ring, the said yoke having a tubular cross piece, the axis of the axle, and that of the cross piece being in the same plane, but the axis of the fluid-pressure actuated mechanism being located to one side of the said plane.

2. A brake mechanism comprising wheels and an axle for the same, a brake ring connected therewith, brake shoes in cooperative relation with the said ring, a brake yoke, the said yoke including a cross piece having end portions which are offset adjacent the wheels, to clear the same, whereby the cross piece is located nearer to the axle, pressure-fluid actuated mechanism supported by the cross piece, for operating the said brake shoes, said mechanism being located between the offset portions, so as to bring it closer to the axle, means attached to the outer ends of the cross piece and pivotally supporting it about the axis of the axle, and means for limiting the extent to which the yoke can thus turn about the said axis.

3. A brake mechanism comprising wheels and an axle for the same, a brake ring connected therewith, brake shoes in cooperative relation with the said ring, a brake yoke, the said yoke including a tubular cross piece having tubular end portions, which are offset adjacent the wheels, to clear the same, whereby the cross piece is located nearer to the axle, pressure-fluid actuated mechanism supported by the cross piece, for operating the said brake shoes, said mechanism being located between the offset portions, so as to bring it closer to the axle, means attached to the outer ends of the cross piece and pivotally supporting it about the axis of the axle, and means for limiting the extent to which the yoke can thus turn about the said axis, the said means comprising a yieldable, resilient element, whereby it will prevent injury from sudden shocks or from lack of alinement in service.

4. A brake mechanism comprising a wheel and axle, a frame supporting the axle, a brake-carrying yoke pivotally supported about the axis of the axle, the said yoke having at least two arms extending therefrom, an apertured member on the frame, one of the said arms extending into the aperture thereof, resilient blocks above and below the said arm respectively, filling the spaces between the said arm and the top and bottom of the aperture, to prevent lost motion of the said arm with respect to the frame, and a second apertured member on the frame, the other arm extending into the aperture thereof, but being out of contact with any portion of the said second member.

5. A brake mechanism comprising a wheel and axle assembly, a brake ring connected therewith, brake shoes in cooperative relation with the opposite faces of said ring, a support for said shoes comprising a yoke extending laterally beyond the wheels and pivotally supported about the axis of the axle outside the wheels, means to prevent the yoke from turning about the axis, and fluid pressure means carried by the yoke and connected to actuate the shoes.

6. A brake mechanism comprising a wheel and axle assembly, a brake ring connected therewith, brake shoes in cooperative relation with the opposite faces of said ring, a support for said shoes comprising a transverse beam arranged substantially in the horizontal plane of the axle and extended between the wheels and laterally therebeyond and supported at its ends for movement concentric with the axle at points outside the wheels, means for preventing the yoke from rotating about said axis, and fluid pressure means carried by the beam and connected to actuate the shoes.

7. A brake mechanism comprising a wheel and axle assembly, a brake ring connected therewith, brake shoes in cooperative relation with the opposite faces of said ring, a support for said shoes comprising a generally horizontally disposed yoke including a transverse beam extending laterally beyond the wheels and pivotally supported about the axis of the axle outside the wheels, and means for actuating said shoes carried by said beam and including an actuating cylinder, said cylinder and the ends of said beam being arranged with portions thereof disposed in the same vertical transverse plane, whereby to foreshorten the brake mechanism in the horizontal plane.

8. A brake mechanism comprising a wheel and axle assembly, a brake ring connected therewith, brake shoes in cooperating relation with the opposite faces of said ring, a support for said shoes comprising a yoke including a transverse beam extending across and beyond the wheels and pivotally supported about the axis of the axle outside the wheels, means preventing rotation of the yoke about said axis, the portion of the beam between the wheels being offset toward the axle, and actuating levers for the shoes pivotally mounted on the offset portion and in close adjacency to the periphery of the brake ring.

9. A brake mechanism comprising a wheel and axle assembly, a brake ring connected therewith, brake shoes in cooperative relation with the opposite faces of said ring, a generally horizontally disposed yoke support for said shoes extending between and beyond the wheels and pivotally supported about the axis of the axle outside the wheels, means for preventing rotation of the yoke about the axle, and safety means associated with said yoke to prevent dropping of the yoke in the event of failure of said rotation preventing means.

10. A brake mechanism according to claim 9 in which the yoke comprises a transverse beam extending between and beyond the wheels, and separate safety means are associated with each end of said beam.

11. A brake mechanism comprising a wheel and axle assembly, a brake ring connected therewith, brake shoes in cooperative relation with the opposite faces of said ring, a support for said shoes comprising a yoke supported at opposite ends through large-diameter bearings surrounding the axle boxes adjacent the ends of the axle, and means preventing rotation of said yoke about the axis of the axle.

12. A brake mechanism comprising a wheel and axle assembly, a brake ring connected therewith, brake shoes in cooperative relation with the opposite faces of said ring, a support for said brake shoes pivotally associated with the axle, means for preventing rotation of the support about the axle, the brake shoes being connected to said support through operating levers one associated with each shoe, and an actuating cylinder and piston disposed between said levers, said cylinder being rigidly fixed to one of said levers, and the piston being connected to the other of said levers.

13. A brake mechanism comprising a wheel and axle assembly, a truck frame supported thereby for relative vertical movement with respect thereto and having a transverse member, a brake-carrying yoke pivotally supported about the axis of the axle including a cross beam generally parallelling the axle and having an arm extending centrally therefrom, a readily detachable bracket rigidly secured to said transverse member and having an aperture receiving the end of said arm whereby to prevent turning of the yoke about said axis.

14. A brake mechanism according to claim 13 in which resilient means are arranged between the arm and the top and bottom walls of said aperture, respectively, and the bracket overlaps the top of said cross member.

15. A brake mechanism according to claim 13 in which the end of the arm is forked and a spring abutment is pivotally supported between the forks, and springs interposed between said abutment and the top and bottom walls of said aperture, respectively.

16. A brake mechanism according to claim 13 in which resilient means are arranged between the arm and the top and bottom walls of said aperture, respectively, the bottom wall being detachable from the top wall to facilitate assembly and disassembly.

CAROLUS L. EKSERGIAN.